March 6, 1962     C. R. BONNELL     3,023,626
TWO AXIS ACCELEROMETER
Filed Oct. 22, 1954

INVENTOR
CHARLES R. BONNELL

BY *George H. Fisher*

ATTORNEY

United States Patent Office 3,023,626
Patented Mar. 6, 1962

3,023,626
TWO AXIS ACCELEROMETER
Charles R. Bonnell, Columbia Heights, Minn., assignor to Minneapolis-Honeywell Regulator Company, Minneapolis, Minn., a corporation of Delaware
Filed Oct. 22, 1954, Ser. No. 464,120
2 Claims. (Cl. 73—517)

My invention relates to an improved acceleration sensing apparatus and more particularly to an improved two axis pendulous accelerometer. Acceleration sensing devices are well known but are generally limited to acceleration sensing in one axis only or are quite complex and large if they are designed to operate in more than one axis. The present invention is directed to a compact two axis pendulous accelerometer design which is extremely simple in construction and utilizes only a single pendulously mounted moving part with no flexible electrical connections attached thereto. This device is extremely accurate and sensitive yet is quite small and economical to manufacture.

It is therefore an object of this invention to provide an improved acceleration sensing apparatus which is compact, simple in design and economical to manufacture and maintain.

It is further an object of this invention to provide an improved acceleration sensing device capable of sensing acceleration simultaneously about a pair of mutually perpendicular axes through a simple compact device.

Figure 1:
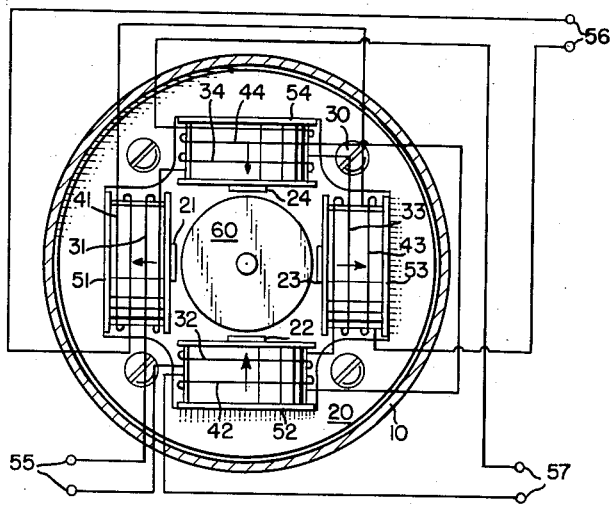
Figure 2:
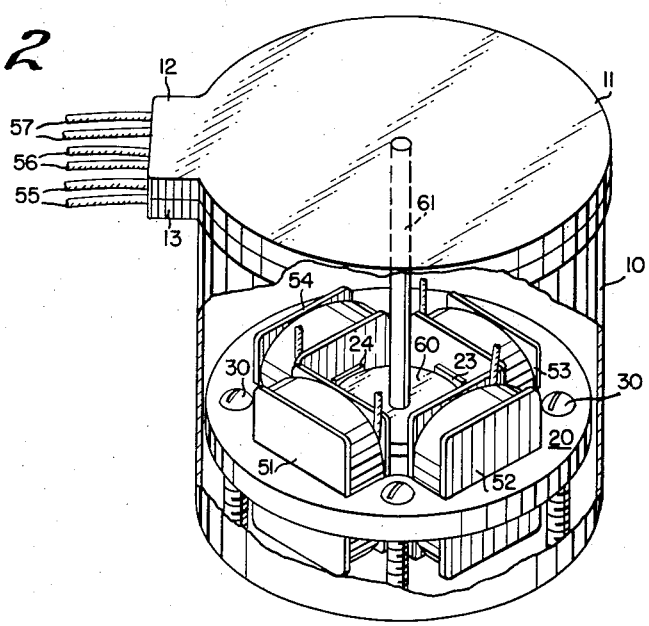

These and other objects of this invention will become apparent from a reading of the attached description together with the drawings wherein:

FIGURE 1 is a plan view of the device with a portion of the casing in section and FIGURE 2 is a perspective view of the device with portions of the casing broken away to disclose the arrangement of parts.

My improved accelerometer as shown ni FIGURES 1 and 2 is housed in a cylindrical casing indicated generally at 10 which is preferably made of a nonmagnetic material and incorporates a cover portion or member attached thereto, the cover indicated at 11 and having a flange portion 12 cooperating with a flange portion of the casing 13 to form an opening through which suitable lead wires may pass from the casing for purposes to be later noted. This cylindrical casing with the cover in place and suitably attached by means not shown, such as screws, is designed to be a sealed unit with suitable seals (not shown) for the lead wires. Housed within the cylindrical casing is a stator or field member 20 which is annular in form and is preferably made up of a number of laminations of magnetic material. The annular form or yoke for the stator has integral therewith four pole pieces or sections defining salient poles indicated at 21-24 which are equidistantly spaced from one another 90 degrees apart to define two pairs of diametrically opposed poles. The pairs of diametrically opposed poles define the axes of operation or sensing of the device such that poles 21—23 define one axis along which the device will then sense the components of acceleration and the poles 22—24 will define the second axis mutually perpendicular with the first named axis along which the device will sense acceleration components. The stator 20 is secured to the casing such as to be fixed thereto by suitable means such as screws indicated at 30.

As indicated in FIGURE 1, the poles 21-24 have a pair of windings thereon hereinafter to be designated primary and secondary windings, the primary windings taking the numbers 31-34 respectively and the secondary windings taking the numbers 41-44 respectively. Each of the windings on the poles are wound together on a bobbin indicated at 51-54 respectively, the bobbin being made of an insulating material and insulating the windings from the metallic portions of the stator. As indicated in FIGURE 1 the primary windings 31-34 are serially connected to one another and to an alternating current source of power indicated at 55. The arrows indicated on the poles in FIGURE 1 indicates the sense or direction of the winding and the instantaneous direction of flux flow through the respective poles associated therewith due to the energization of the primary windings mounted thereon. Thus it will be seen that in connection with poles 21—23 the flux would be directed away from the pole face and toward the yoke of the stator while in the connection with poles 22 and 24 the flux would be directed inwardly toward the pole face and the associated inductive element to be hereinafter described. The secondary windings mounted on the poles are connected such that diametrically opposed poles have their secondary windings connected in the series circuit and in such a manner that the voltage generated therein will be in opposition to one another such that under normal conditions these induced voltages will cancel out in the output circuit. Thus windings 41 and 43 are serially connected in an opposite sense and are connected to an output circuit indicated at 56 while the windings 42 and 44 are connected in series with one another and in an opposite sense and to an output circuit indicated at 57. Positioned within an air gap defined by the pole faces of the poles 21-24 is an armature element of magnetic material, the armature being shown at 60 in FIGURE 1 and cylindrical in form. The armature is preferably made of a laminated magnetic material and is suitably assembled or secured together, this member as will be later described cooperating with the poles to provide a magnetic path for the flux generated by the primary windings such that it will thread the secondary windings and circulate within the yoke portion of the stator to complete the magnetic circuit. The armature 60 is shown herein as mounted on a shaft indicated at 61, the armature being mounted at one extremity of the shaft which is free and the opposite extremity of the shaft being secured through suitable means not shown to the cover portion 11 of the casing. Shaft 61 is a flexible construction and having a predetermined spring restraint such that the armature may be displaced from its normal position under the influence of acceleration forces applied to the armature and with respect to the poles but the shaft 61 will not permit rotational movement of the armature 60. While armature 60 has been shown as mounted on a flexible shaft 61 having spring restraint, it will be appreciated that other types of mountings may be utilized, such as a flexible wire suspension mounting the armature in a neutral position and secured at its extremities to the casing.

The accelerometer device is assembled in the manner shown in FIGURE 2 with the stator secured to the casing and the armature secured to the cover portion of the casing or as otherwise suggested and the device may be then filled with a damping fluid of a suitable sort such that the fluid surrounds the shaft and armature and is in contact with the stator. The connections to the primary windings such as the lead wires going to the alternating current source of power are brought through the flange portions 12 and 13 of the casing and similarly the connections between the diametrically opposed secondary windings and each of the pairs of diametrically opposed poles are brought out through the flange portions 12 and 13 to be connected to external circuits. Where desired suitable heater means and a thermostatic control may be added to the accelerometer to control ambient temperature of the device and provide for a constant damping factor for the device.

In operation, the device is positioned such that the axes defined by the diametrically opposed poles are aligned with the axes along which the acceleration forces are desired to be sensed. While no particular reference attitude has been heretofore set forth for my improved accelerometer, it will be readily understood that the apparatus may be used in any position.

With the primary winding energized, and the armature in the neutral position equidistantly spaced from the poles, the flux generated secondary windings will cancel out in the output circuits and the output of the device for both axes will be at a null condition. With an acceleration force applied along the axes defined by the poles 21–23, the armature will be shifted against the spring restraint of its mounting either closer to pole 21 or 23 depending upon the direction of the force to couple the secondary winding on the pole toward which the armature is shifted to a greater degree with the primary winding and cause a larger induced secondary voltage to exist therein and at the same time will decrease the coupling between the primary and secondary winding on the opposite pole reducing the induced voltage therein. These voltages are added in the output circuit and being of an opposite sense the resultant voltage will be present in the output circuit of a predetermined sense depending upon the direction of the acceleration force and the magnitude depending upon the magniture of the acceleration force. It will be evident that the shifting of the armature toward one or two of the poles and away from one or two of the poles will tend to shorten the gap for the flux flow from the respective primary windings to the poles in the yoke portion of the stator and armature thereby decreasing the magnetic reluctance of the circuit defined thereby. This decrease in reluctance of the magnetic circuit will vary the flux flow through the respective magnetic circuit to a degree that the induced voltage by the winding threaded by the flux will be increased or decreased depending upon whether the flux is increased or decreased.

It will also be evident that the device may sense acceleration forces or components along both axes simultaneously displacing the armature other than in direct alignment with the poles or the axes defined by the poles to give outputs from the secondary windings associated therewith in proportion to the amount of displacement. By providing a signaling device with very small input movements and a mass restrained to small movement, an accelerometer with a very high natural frequency and response is produced. With the fluid damping the movement of the armature within the casing extraneous vibrations and oscillations are dampened and an extremely sensitive yet accurate device is obtained.

In considering this invention it should be kept in mind that the present disclosure is illustrative only and that the scope of the invention should be determined only by the appended claims.

I claim as my invention:

1. A two axis accelerometer comprising: a housing; an annular stator member of magnetic material mounted on said housing, said stator member comprising four integral equiangularly spaced poles coplanar with said stator and extending radially inwardly toward one another so as to define an opening therebetween; a resilient rod member mounted at one end on said housing and positioned so that the other end is adjacent said opening and so that said rod element in the absence of any lateral forces being imparted thereto is substantially perpendicular to a plane including said stator and said poles; an armature member mounted on said other end of said rod and adapted when mounted to be positioned within said opening and symmetrically spaced from said poles in the absence of any lateral forces being imparted thereto; and primary and secondary windings mounted on each of said poles, all of said primary windings being adapted to be connected to a source of voltage, and the secondary windings on diametrically opposed poles being connected so that the voltages induced therein from their associated primary windings are of opposite sense, said armature constituting a seismic element and said resilient rod permitting said armature to be displaced laterally away from a null signal producing position in response to lateral accelerations so as to unbalance the magnetic flux distribution in said poles and thus to produce signals indicative of the sense and magnitude of said lateral accelerations.

2. A two axis accelerometer comprising: a housing; a stator member of magnetic material mounted on said housing, said stator member comprising a yoke portion and a plurality of spaced poles coplanar with said stator and extending inwardly toward one another so as to define an opening therebetween; a resilient rod member connected at one end to said housing and positioned so that the other end is adjacent said opening and so that said rod element in the absence of any lateral forces being imparted thereto is substantially perpendicular to a plane including said stator and said poles; an armature member mounted on said other end of said rod and adapted when mounted to be positioned within said opening and symmetrically spaced from said poles in the absence of any lateral forces being imparted thereto; and primary and secondary windings mounted on each of said poles, all of said primary windings being adapted to be connected to a source of voltage, and the secondary windings on opposed poles being connected so that the voltages induced therein from their associated primary windings are of opposite sense, said armature constituting a seismic element and said resilient rod permitting said armature to be displaced laterally away from a null signal producing position in response to lateral accelerations so as to unbalance the magnetic flux distribution in said poles and thus to produce signals indicative of the sense and magnitude of said lateral accelerations.

References Cited in the file of this patent

UNITED STATES PATENTS

| | | |
|---|---|---|
| 1,317,072 | Carlier | Sept. 23, 1919 |
| 2,377,212 | Cottrell | May 29, 1945 |
| 2,494,579 | Pimlott et al. | Jan. 17, 1950 |
| 2,514,250 | Meredith | July 4, 1950 |
| 2,516,912 | Reichel et al. | Aug. 1, 1950 |
| 2,552,722 | King | May 15, 1951 |
| 2,601,440 | Kerrigan | June 24, 1952 |
| 2,665,896 | Kirby et al. | Jan. 12, 1954 |

FOREIGN PATENTS

| | | |
|---|---|---|
| 272,198 | Germany | May 12, 1911 |
| 729,894 | Germany | Dec. 19, 1942 |